United States Patent
Archer et al.

[15] 3,681,469
[45] Aug. 1, 1972

[54] STABILIZATION OF 1,1,1-TRICHLOROETHANE

[72] Inventors: Wesley L. Archer, Midland; Elbert L. Simpson, Auburn, both of Mich.

[73] Assignee: The Dow Chemical Company, Midland, Mich.

[22] Filed: Sept. 21, 1970

[21] Appl. No.: 74,154

[52] U.S. Cl............260/652.5 R, 252/162, 252/171
[51] Int. Cl.........................C07c 17/42, C07c 17/40
[58] Field of Search ............260/652.5; 252/162, 171

[56] References Cited

UNITED STATES PATENTS 3,049,571  8/1962  Brown .......................260/652.5
3,360,575  12/1967  Brown .......................260/652.5
3,445,532  5/1969  Richtzenhain et al. ....260/652.5
3,499,047  3/1970  Cormany et al. ..........260/652.5
3,505,415  4/1970  Richtzenhain et al. ....260/652.5
3,564,063  2/1971  Cormany et al. ..........260/652.5
3,565,811  2/1971  McDonald.................260/652.5

*Primary Examiner*—Howard T. Mars
*Attorney*—Griswold & Burdick, J. Roger Lochhead and Glwynn R. Baker

[57] ABSTRACT

The reaction of 1,1,1-trichloroethane with metals in inhibited by the presence in the 1,1,1-trichloroethane of a small amount of benzyl fluoride and/or benzotrifluoride.

1 Claim, No Drawings

STABILIZATION OF 1,1,1-TRICHLOROETHANE

BACKGROUND OF THE INVENTION

This invention relates to the stabilization of chlorinated solvents. More particularly, the present invention concerns the stabilization of 1,1,1-trichloroethane in the presence of metals, such as aluminum, iron, brass, zinc and the like.

Chlorinated hydrocarbons such as trichloroethylene and perchloroethylene are commonly used as solvents in chemical processes, dry cleaning, and metal degreasing. Solvents of this type are subject to slow decomposition and oxidation reactions, particularly in the presence of impurities such as water, traces of acid or metal salts. Corrosion of metal surfaces in containers and process equipment and deterioration of solvent quality by formation of acidic and colored byproducts thereby become serious problems. Inhibitors such as acid scavengers and antioxidants are commonly added to these solvents in order to prevent such degradative reactions. Inhibitor concentrations are normally of the order of one percent by weight or less.

1,1,1-Trichloroethane poses a particularly difficult stabilization problem because of its unusual reactivity with the above metals, notably aluminum. Traces of metal salts, moisture or other impurities are not needed to initiate the 1,1,1-trichloroethane-aluminum reaction, for this reaction occurs spontaneously on a freshly exposed aluminum surface with spectacular results, converting the solvent and the metal surface in a few minutes to a blackened mass of acidic, carbonaceous material and aluminum salts. Conventional acid acceptor stabilizers cannot be depended upon to inhibit the aluminum-1,1,1-trichloroethane reaction and suitable inhibitors must be discovered by independent investigation. The search has yielded few effective compounds and these show little or no obvious pattern of structure. Typical 1,1,1-trichloroethane formulations contain about 5 percent by weight of inhibitor which is usually a combination of compounds to inhibit reaction of the solvent with a variety of metals.

SUMMARY OF THE INVENTION

It has now been found that the 1,1,1-trichloroethane reaction can be substantially retarded or prevented by incorporating into the 1,1,1-trichloroethane an inhibiting amount of benzyl fluoride or benzotrifluoride. Such compounds may be used alone or in combination with each other or with other nonreactive conventional inhibitors, such as nitromethane and an epoxide.

Only a quantity of benzyl fluoride and/or benzotrifluoride sufficient to retard or to stop the reaction of metals and 1,1,1-trichloroethane need be used. Although any significant amount will provide some inhibition, preferably about 0.1 to 1.0 gram mole per liter of 1,1,1-trichloroethane is employed.

SPECIFIC EMBODIMENTS

The above compounds were tested for inhibiting activity in elongated glass test tubes having an inside diameter of 0.8 cm. and 33 cm. in length. To each vertically disposed tube there was added 0.54 g. of essentially pure 16-32 mesh granular aluminum and a solution of the inhibitor in purified 1,1,1-trichloroethane to make a total volume of test mixture of 5 ml. The closed ends of the test tubes were then immersed in an oil bath held at a temperature sufficient to maintain the 1,1,1-trichloroethane solution in each tube at a steady reflux. The results listed in the following examples indicate the minimum concentration of the inhibitor found effective to provide complete inhibition of the 1,1,1-trichloroethane-aluminum reaction for 24 hours under these conditions. Prevention of the reaction for this length of time under the described conditions indicates capacity for effective inhibition for an indefinite period. Concentrations are given in gram moles per liter, this figure being convertible to weight percent by the equation $$\text{Wt. percent} = \frac{(\text{moles/liter})(\text{mol. wt. of inhibitor})}{13.46}$$

| Example | Compound | Effective Concentration g.-moles/liter |
|---|---|---|
| 1 | benzyl fluoride | 0.017 |
| 2 | benzotrifluoride | 0.50 |

Additional tests, utilizing 2 ½ inch × ½ inch × 1/16 inch coupons of 2024 and 1100 aluminum, 1010 iron, 70/30 brass and pure zinc were carried out for 7-day periods. The coupons were placed in 65 ml. of 1,1,1-trichloroethane containing the inhibitor (4 percent by volume of the fluoro compound along with 0.5 percent by volume of each of butylene oxide and nitromethane). Part of the coupons extended above the liquid level. The test coupons were examined for signs of corrosion after 7 days in refluxing test solution. Corrosion ratings are represented by numbers 0–5, where 0 is no corrosion up to 5 which is heavy corrosion.

| Fluoro compound | Condition of coupons | | | | | | | | | | Color of final soln. |
|---|---|---|---|---|---|---|---|---|---|---|---|
| | 2024 Al | | 1100 Al | | Iron | | Brass | | Zinc | | |
| | L.P.[a] | V.P.[b] | L.P. | V.P. | L.P. | V.P. | L.P. | V.P. | L.P. | V.P. | |
| Benzyl fluoride | 0 | 0 | 0 | 0 | 0 | 0 | 0 | 1 | 2 | 0 | Turbid but colorless. |
| Benzotrifluoride | 0 | 0 | 0 | 0 | 0 | 0 | 1 | 1 | 1 | 0 | Colorless. |

[a] L.P. are liquid phase corrosion observations.
[b] V.P. are vapor phase corrosion observations.

We claim:

1. A 1,1,1-Trichloroethane composition stabilized against reaction with metals consisting essentially of 1,1,1-Trichloroethane and a small but inhibiting amount of benzyl fluoride, benzotrifluoride or a combination thereof.

* * * * *